3,177,643
DOUBLE-TWIST SPINDLE

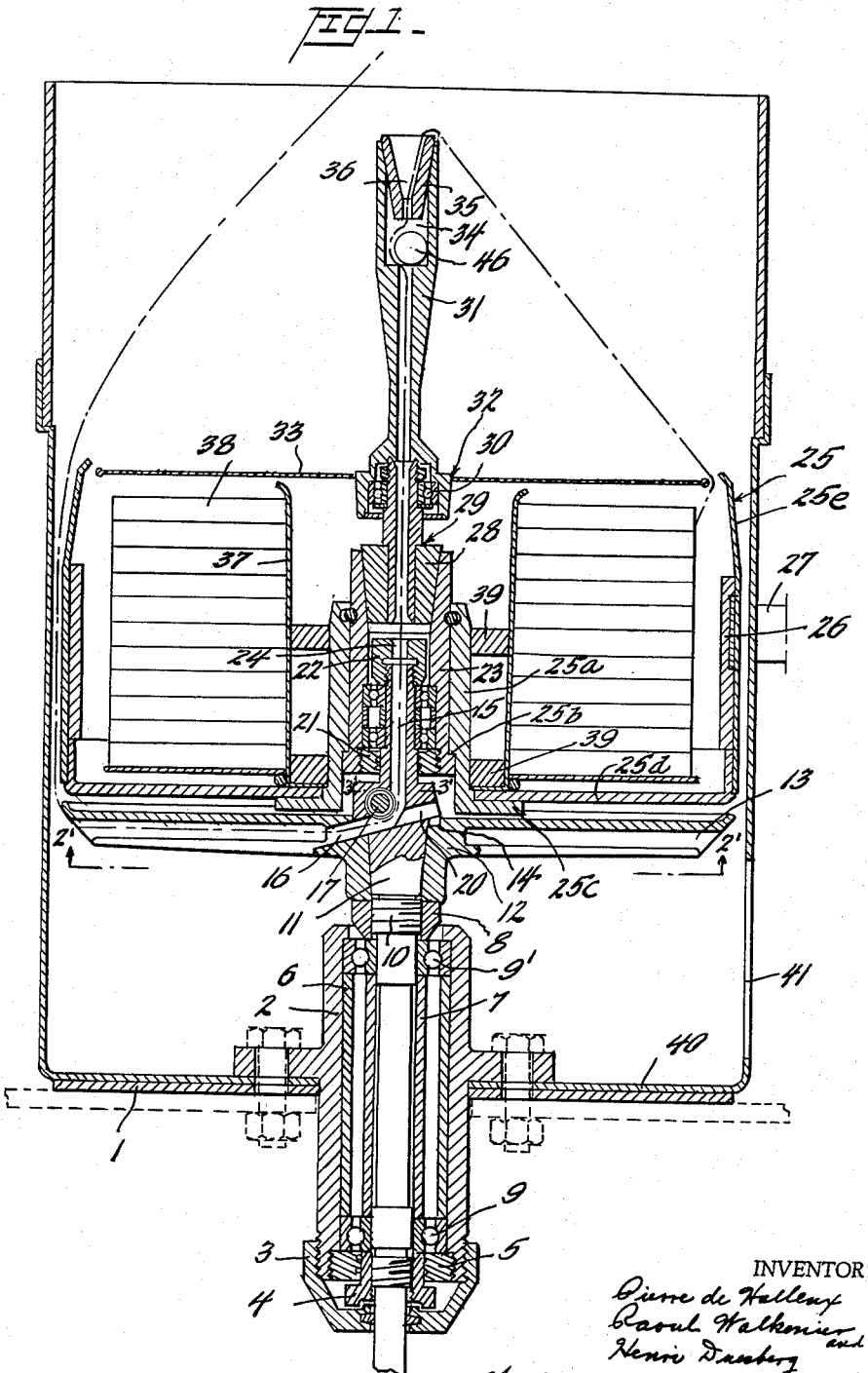

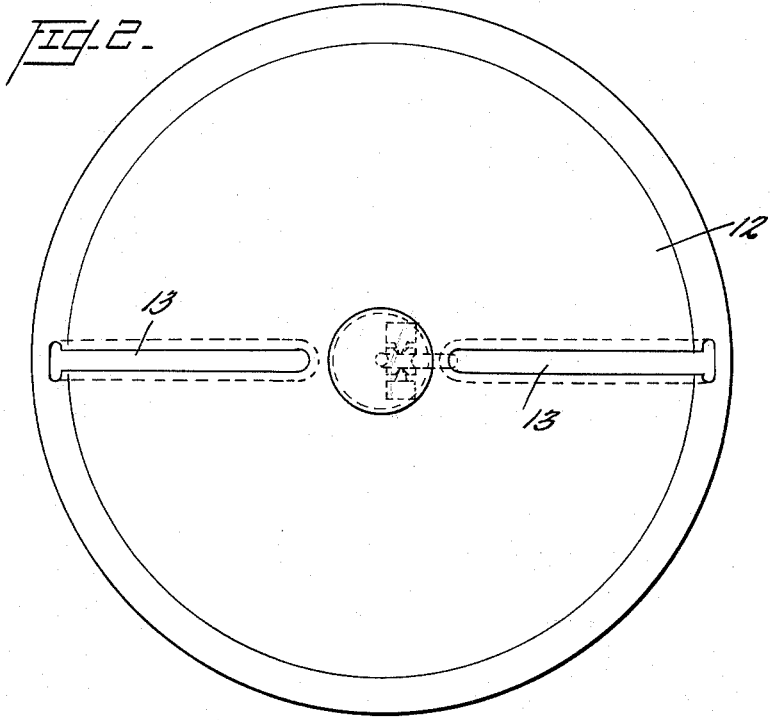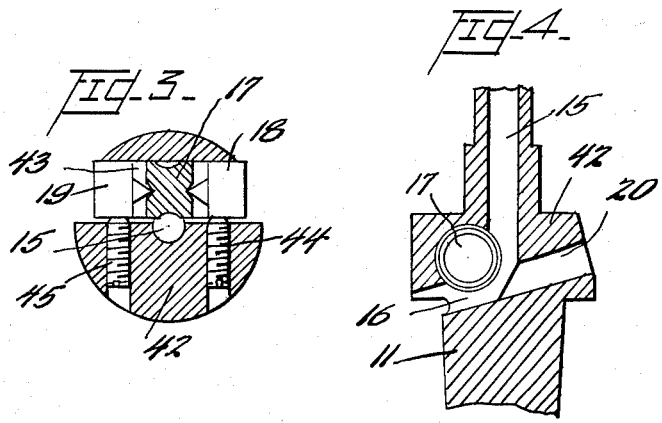

Pierre de Halleux, Woluwe-St.-Pierre, Raoul Walkenier, Grimbergen, and Henri R. Duesberg, Limbourg, Belgium, assignors to Doutors, Société Anonyme Holding, Luxembourg, Luxembourg, a company
Filed Oct. 22, 1963, Ser. No. 318,053
Claims priority, application Luxembourg, Oct. 23, 1962, 42,576
6 Claims. (Cl. 57—58.86)

The invention relates to a doubletwist spindle for twisting paper or another material cut into strips into string or thread.

It consists of a double-twist spindle which has for the material to be twisted a circular magazine loosely mounted on the spindle shaft and kept stationary, and in which the material, after passing over a guiding disc, through a funnel and along a duct in the spindle shaft, is conducted first towards a roller that is situated at the intersection of this duct and another duct running obliquely or perpendicularly to the spindle shaft and is rotatable about an axis perpendicular to that of the spindle, and then along a plate perpendicular to the spindle axis and rigidly connected with the spindle towards a thread guide situated above in the axis of the spindle; the guiding disc being flexible and rigidly connected with a truncated hollow cone whose smaller end has a diameter less than the width of the strip which is to be twisted, neither cone nor guiding disc rotating with the spindle; the roller being rigidly connected with the spindle and in the form of a diabolo turning between two points; and the plate rigidly connected with the spindle having in its lower surface a groove T-shaped in cross-section adapted to receive the thread as it leaves the spindle.

Because of the flexibility of the guiding disc and the braking effect of the cone which is rigidly connected with it, it is possible to stack in the magazine of the spindle a considerable number of spools of which the strips are connected together at their ends, without risk, when passing from the end of one spool to the beginning of the next, of jerks caused by tension, the more perceptible, the faster the spindle is turning, which would spoil the regularity of the twisting.

When there is a change of direction the rotating diabolo member guides the thread after it has received one twist, preventing the abrasive effects which cause many breaks, and the T-shaped groove on the lower surface of the plate allows rapid threading of the thread in spite of the anti-ballooning casing which must necessarily enclose a very high-speed spindle.

The diameter of the smaller end of the hollow truncated cone rigidly connected with the flexible guiding disc is between 30 and 70% and preferably between 40 and 60% of the width of the strip of material being twisted.

The invention will now be described with reference, by way of example only, to an embodiment shown in the accompanying drawings.

In those:

FIG. 1 is a section along a diameter of the spindle, the lower part of the shaft of the spindle not being in section;

FIG. 2 shows by a section along the line 2'—2' in FIG. 1 the lower surface of the circular plate and the form of the groove in this plate;

FIG. 3, by a section along the line 3'—3' in FIG. 1, shows the mounting of the diabolo member in the pivot of the spindle; and FIG. 4 is a vertical sectional view of the portion of FIG. 1 to which FIG. 3 corresponds.

On a base 1 there is fixed a sleeve 2 inside which are held two ball bearings 9 and 9', by the combined action of a cover 3 of the said sleeve 2, of the locking nut 5, the threaded retaining ring 4, the tubular intermediate spacing members 6 and 7, and the locking nut 8. These ball bearings provide anti-friction means in which the shaft 10 of the spindle turns.

This shaft 10 comprises a conical portion 11 acting as support for a plate 12 perpendicular to it, whose lower surface has diametrically opposite grooves 13 T-shaped in cross-section (FIG. 2). The plate 12 rests against a shoulder 14 of the pivot 10 and is supported by a ring 8 resting on the ball bearing 9'. A cylindrical duct 15 runs in the axis of the pivot to a point corresponding to the level of the upper surface of the plate 12, where it joins a transverse duct 16 bored along a diametrical plane and with one end coming out at the level of the grooves 13 cut in the plate.

In the angle formed by the two ducts there is a diabolo member 17 mounted between two pointed members 18 and 19 (FIG. 3). The annular groove in the diabolo member is preferably quite shallow, its section being arcuate upon a rather long radius of curvature, as clearly shown in FIGURE 3. This serves to maintain the strip or ribbon substantially in the axial plane of the spindle without any rubbing or abrasion at the edges thereof.

In the portion 20 of the transverse duct that does not communicate with the groove in the plate, a plug for balancing the weight of the diabolo member is inserted.

On the upper end of the pivot two ball bearings supporting a sleeve 23 are mounted by means of screw nuts 21 and 22.

The upper nut 22 has a bore 24 corresponding to the central duct 15 in the pivot. The sleeve 23 supports an annular magazine 25. Said annular magazine is constituted by a cylinder or sleeve 25a resting upon the shoulder 25b of the sleeve 23, said cylinder 25a having a flange 25c upon which is supported a flanged piece 25d on which the cylindro-conical outer casing 25 is affixed. Said piece 25e carries on its external diameter a steel member 26 allowing the magazine to be held stationary during rotation of the spindle, owing to a magnet 27 fixed on the exterior anti-ballooning casing 40. The internal cylindrical surface of the sleeve 23 ends in a conical portion 28 on which bears the support of a hollow shaft 29. This shaft, by way of a ball bearing 30, acts as support for the turned and axially bored hollow funnel-carrying guide tube 31, in a slot 32 in which is set a flexible guiding disc or cover plate 33 of synthetic plastics material, the outside edge of which is carefully polished.

The hollow tubular funnel-carrying member 31 has an enlarged bore 34 into which fits a detachable plug or funnel 35 with a bore 36 in the form of an inverted truncated cone of which the smaller end has a diameter less than the width of the strip of material being processed, so as to effect a crumpling of the strip or ribbon and a restraining or checking of the same within the funnel. The height of the funnel and the diameter of the guiding disc are choosen according to the minimum angle that the strip can form in its passage over the edge of the cover plate.

A support 37 is introduced into the magazine. Spools or reels 38 of strips or ribbons (of which eleven are shown in FIG. 1) are stacked on the support 37, which is centered on the shaft of the spindle by means of two rings 39. The ends of the strips of adjacent spools are connected together.

In the lower portion of the anti-ballooning casing 40 there is an opening 41 big enough to admit a hand.

A ball 46 may be placed in the enlargement 34 below the plug 35 to increase braking.

FIGS. 3 and 4 show the mounting of the diabolo member 17 between the pointed supports 18 and 19.

The conical portion 11 of the pivot is succeeded by a wider portion 42, across which the duct 16 is bored. Perpendicularly both to the duct 16 and to the shaft of the spindle there runs a duct 43 into which the diabolo member 17 and its two pointed supports 18 and 19 can be introduced. These supports are immobilised by setscrews 44 and 45.

The spindle is made to rotate by known means, such as a drive belt or individual electric motor.

The following is an example of the use and operation of the spindle device according to the present invention.

In the magazine 25 are stacked a desired number of spools or reels of strip material to be twisted (11 in the case of FIGURE 1); the internal end of the strip on the first spool is connected to the outer end of the strip on the second spool in such manner as to avoid a thick overlapping at the juncture; the internal end of the second spool is similarly connected to the outside end of the strip of the third spool, and so on. In loading or threading up this spindle, the end of the strip from the uppermost spool is held and lightly twisted by hand before insertion into the tapered bore 36 of the funnel 35; the ribbon then passes through the ducts of the member 31 of the funnel device and of the hollow shaft portion 29, then through the ducts 15 and 16 of spindle shaft 11, to come out freely in the anti-ballooning casing 40. Through opening 41 of the casing, one of the operator's hands can seize the strip or ribbon and place it on a hook that can be lowered by the other hand between said casing 40 and the circular wall 25e of magazine 25. The strip to be twisted is removed from casing 40 by means of the hook, and is then led into suitable guiding means (of known type and not shown) which may be placed over and disposed axially of the spindle, and finally toward a winding device of known type. The rotation of the spindle may then be started and the strip or ribbon, which is already partially twisted, is pulled along the lower surface of the plate 12 and goes automatically into one of the arms of the T-shaped groove 13.

The novel structure of the spindle device, therefore, facilitates an easy and rapid threading of the ribbon to be twisted. During the operation, the strip, the width of which is greater than the diameter of the base of the funnel bore 36, is subjected to a crumpling which is favorable to its subsequent twisting, as well as to a restraining or checking action which regulates its tension, particularly upon encountering the end of the strip on a spool or reel and the beginning of the strip on the following reel, which causes a certain waving of the strip. The prior passage of the strip against the smooth edge of the flexible guiding disc 33, which effects the rotation of said guiding disc through friction, effects additional straining or braking. The guiding disc, because of its flexibility and its rotating motion, has the advantage of providing a progressive and soft damping or shock absorbing action, serving to smooth out any jolts or sudden tensions occurring in the strip during its unwinding.

The shape given to the guide or diabolo 17 insures that the ribbon is held in the axial plane of the spindle without fear of lateral rubbing on the ribbon or strip being twisted, as would be the case with certain double flanged wheels or deeply grooved rollers heretofore employed. As to the T-section of the groove 13 in the lower plate, in addition to the advantages it offers for the mounting of the spindle, it also protects the ribbon against the action of air during the twisting operation. Thus the novel structure results in an ease and safety of operation as contrasted with known devices which subject the strips or ribbons to rougher stresses.

We claim:

1. A double twist spindle adapted for twisting flat strip material and comprising, in combination, a rotary spindle shaft having a duct extending axially thereof; an annular magazine for containing at least one reel of such strip material, means for maintaining said magazine substantially stationary during the operation of the spindle; a funnel device coaxial with said spindle shaft communicating with the duct in said spindle shaft and rotatable independently of the shaft and of the magazine; a circular cover plate for said magazine rigid with said funnel device and thus also rotatable independently of said shaft and said magazine, said cover plate comprising a guide disc having a smooth rim over which said strip material may freely be drawn; a cross duct passing substantially radially through the lower portion of said shaft and intersecting said axial shaft duct; and a second circular plate coaxial with, perpendicular to and fixed to the lower portion of said shaft and having at least one radial passageway through which the twisted strip may pass from said radial duct and thence around the outer margin of this magazine.

2. The spindle as set forth in claim 1 in which the interior of said funnel device is in the shape of an inverted truncated cone, the lower smaller end of which is between 30% and 70% of the width of the strip to be twisted.

3. The spindle as set forth in claim 1 in which the interior of said funnel device is in the shape of an inverted truncated cone, the lower smaller end of which is between 40% and 60% of the width of the strip to be twisted.

4. The spindle as set forth in claim 1 in which there is disposed at the junction of the axial and radial ducts in said spindle shaft, a guide roller in the form of a diabolo having a shallow peripheral groove of less than 180° of arc around which the strip is trained, and there are provided means for rotatably supporting said roller which comprises a pair of pointed pivot pins.

5. The spindle as set forth in claim 4 in which the pivotal supports of said roller are off-center with respect to said shaft, the radial duct is prolonged through the shaft, and the prolonged portion provided with a plug to counterbalance the guide roller.

6. The spindle as set forth in claim 1 in which said lower second plate is provided with an open radial groove in the bottom surface thereof, the groove being T-shaped in cross-section and having its radially inner end registering with the outlet of said radial shaft duct.

References Cited by the Examiner

UNITED STATES PATENTS

| 2,445,721 | 7/48 | Bartholomew | 57—58.86 X |
| 2,492,581 | 12/49 | Kingsbury | 57—58.86 |
| 2,576,124 | 11/51 | Kingsbury | 57—58.74 |
| 2,620,617 | 12/52 | Bley | 57—58.86 X |
| 3,121,989 | 2/64 | Chapuis et al. | 57—58.55 X |

FOREIGN PATENTS 725,283  3/55  Great Britain.

MERVIN STEIN, *Primary Examiner.*